United States Patent
Du et al.

(10) Patent No.: US 12,371,278 B2
(45) Date of Patent: Jul. 29, 2025

(54) PICK AND PLACE APPARATUS AND TRANSPORTING MACHINE

(71) Applicant: WISTRON CORP., New Taipei (TW)

(72) Inventors: haikang Du, New Taipei (TW); Baichang Cen, New Taipei (TW); Yu Tao, New Taipei (TW); Chunying Zhang, New Taipei (TW); Yucheng Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 414 days.

(21) Appl. No.: 18/055,854

(22) Filed: Nov. 16, 2022

(65) Prior Publication Data
US 2024/0059503 A1 Feb. 22, 2024

(30) Foreign Application Priority Data

Aug. 19, 2022 (CN) .......................... 202210997292.5

(51) Int. Cl.
*B65G 47/90* (2006.01)
(52) U.S. Cl.
CPC .................................. *B65G 47/90* (2013.01)
(58) Field of Classification Search
None
See application file for complete search history.

(56) References Cited

U.S. PATENT DOCUMENTS

| | | | | |
|---|---|---|---|---|
| 4,124,104 A | * | 11/1978 | Yarris | B66F 9/12 187/238 |
| 4,690,602 A | * | 9/1987 | Castaldi | B65G 1/0435 414/280 |
| 7,153,081 B2 | * | 12/2006 | Watanabe | B66F 9/141 414/940 |
| 9,227,797 B2 | * | 1/2016 | Yang | B66F 9/07 |
| 9,242,810 B2 | * | 1/2016 | Lõssov | G06Q 10/08 |
| 9,718,617 B2 | * | 8/2017 | Koide | B65G 1/0492 |
| 10,420,265 B2 | | 9/2019 | Zhang et al. | |
| 11,077,466 B2 | * | 8/2021 | Bonora | H01L 21/67772 |
| 2006/0216137 A1 | * | 9/2006 | Sakata | H01L 21/67766 414/222.13 |

FOREIGN PATENT DOCUMENTS

| | | |
|---|---|---|
| CN | 109748027 A | 5/2019 |
| CN | 209192812 U | 8/2019 |
| CN | 111792254 A | 10/2020 |
| TW | 201742546 A | 12/2017 |

OTHER PUBLICATIONS

TW Office Action dated Jul. 10, 2023 in Taiwan application No. 111133797.

* cited by examiner

*Primary Examiner* — Michael S Lowe
(74) *Attorney, Agent, or Firm* — McClure, Qualey & Rodack, LLP

(57) ABSTRACT

A pick and place apparatus, adapted for a carrier, includes a housing connected to the carrier, a lifting assembly movably disposed on the housing, and a pick and place assembly movably disposed on the lifting assembly. A movable direction of the pick and place assembly relative to the lifting assembly is perpendicular to a movable direction of the lifting assembly.

20 Claims, 6 Drawing Sheets

PICK AND PLACE APPARATUS AND TRANSPORTING MACHINE

CROSS-REFERENCE TO RELATED APPLICATIONS

This non-provisional application claims priority under 35 U.S.C. § 119(a) on Patent Application No(s). 202210997292.5 filed in China on Aug. 19, 2022, the entire contents of which are hereby incorporated by reference.

TECHNICAL FIELD

The disclosure relates to a pick and place apparatus, more particularly relates to a pick and place apparatus adapted for a carrier and a transporting machine including the same.

BACKGROUND

Assembling, manufacturing, and other related industrial sectors are the most important development factors for economic growth in many countries.

Many manufacturers provide services such as processing or manufacturing of various parts or products. To ensure that the final products meet the predetermined specification, the relevant tests are necessary to carry out on the final products.

Conventionally, product testing is conducted by labor force, workers or technicians have to manually carry the products to go through the testing processes. However, with the increasing labor costs in recent years, product testing done by manual will lead to a substantial increase in overall cost.

SUMMARY

Accordingly, one aspect of the disclosure is to provide a pick and place apparatus for a carrier and a transporting machine including the same which are capable of realizing integration of an automatic guided vehicle system into testing processes and thereby reducing labor cost.

One embodiment of the disclosure provides a pick and place apparatus, adapted for a carrier, including a housing connected to the carrier, a lifting assembly movably disposed on the housing, and a pick and place assembly movably disposed on the lifting assembly. A movable direction of the pick and place assembly relative to the lifting assembly is perpendicular to a movable direction of the lifting assembly.

Another embodiment of the disclosure provides a transporting machine including a carrier and a pick and place apparatus, the pick and place apparatus includes a housing connected to the carrier, a lifting assembly movably disposed on the housing, and a pick and place assembly movably disposed on the lifting assembly. A movable direction of the pick and place assembly relative to the lifting assembly is perpendicular to a movable direction of the lifting assembly.

According to the pick and place apparatus and the transporting machine as discussed in the above embodiments of the disclosure, the housing of the pick and place apparatus can be disposed on a carrier, so that it is possible to adopt an automatic guided vehicle system into testing station and thereby achieving an automated testing processes and reducing labor cost.

Also, the pick and place apparatus has a lifting assembly and a pick and place assembly being movable perpendicularly with each other on the housing, such that the pick and place apparatus can move the pick and place assembly to a proper height and position for it to pick and place object to be tested or tested object.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Figure 1:
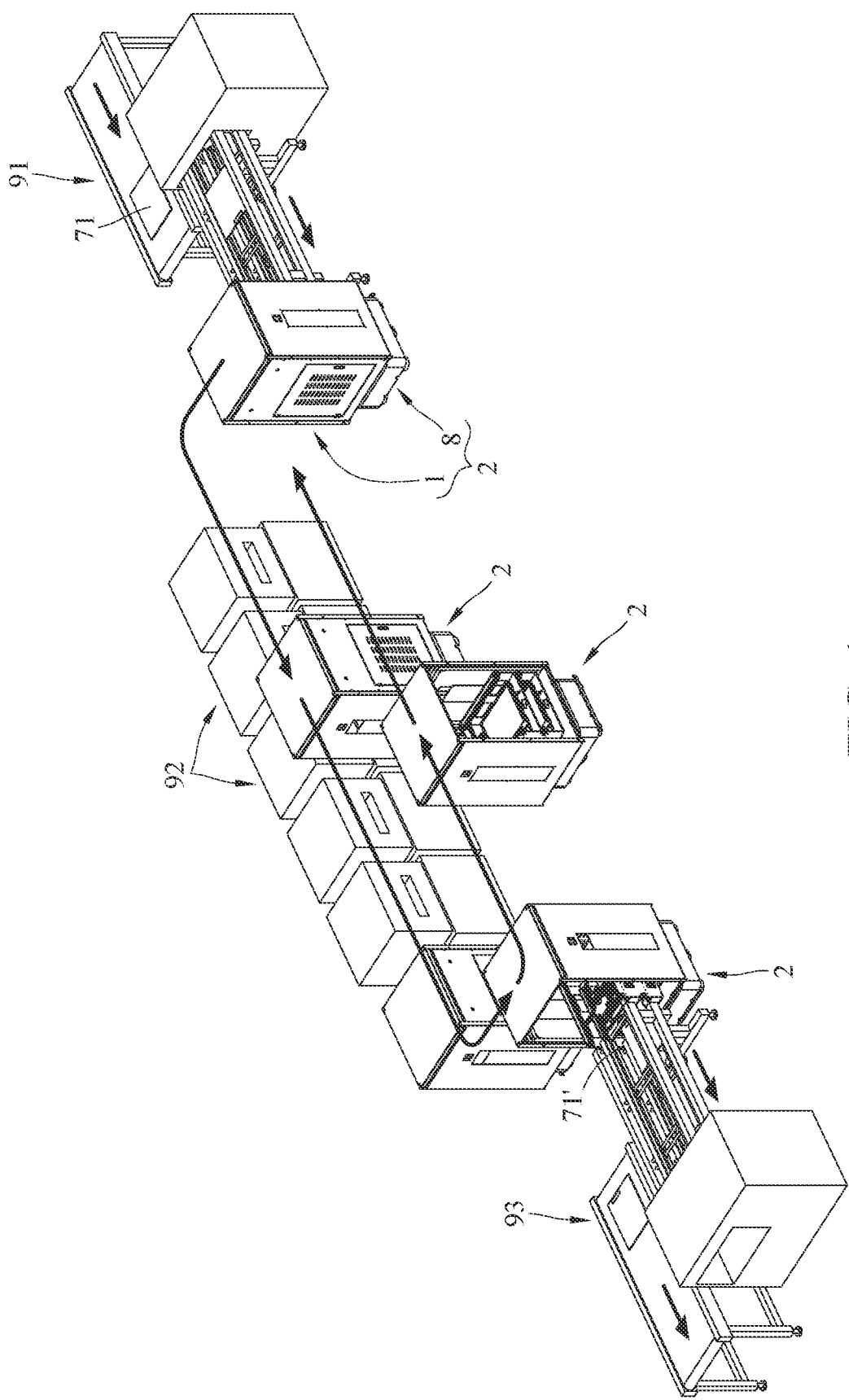
FIG. 1 depicts how a pick and place apparatus according to one embodiment of the disclosure works during testing task.

Firstly, please refer to FIG. 1, one embodiment of the disclosure provides a pick and place apparatus 1. One or more of the pick and place apparatus 1 may be carried by a carrier 8. The pick and place apparatus 1 and the carrier 8 may be served as a transporting machine 2. The carrier 8 may be, but is not limited to, any suitable portable robot or an automated guided vehicle (AGV). The carrier 8 can follow along marked lines or wires on the floor, or can use radio wave, vision camera, or laser for navigation. Thus, by the carrier 8, the pick and place apparatus 1 can be moved as planned.

For example, as the arrows shown in FIG. 1, the transporting machine 2 can be moved to pick up an object to be tested 71 from a material-supplying apparatus 91, then, the carrier 8 can move the pick and place apparatus 1 to one of testing apparatus 92 so that the pick and place apparatus 1 can put the object to be tested 71 into the selected testing apparatus 92 for testing, then the pick and place apparatus 1 can obtain a tested object 71' from the testing apparatus 92, and then the carrier 8 can move the pick and place apparatus 1 to a material-collecting apparatus 93 so that the pick and place apparatus 1 can place the tested object 71' to the material-collecting apparatus 93. By the time, the pick and place apparatus 1 will be moved back to the material-supplying apparatus 91 to pick up next object to be tested 71. The carrier 8 can repeatedly move the pick and place apparatus 1 as indicated by the arrows, such that the pick and place apparatus 1 is able to repeatedly perform steps, such as picking up an object to be tested 71, feeding the object to be tested 71 to a selected testing apparatus 92, and providing a tested object 71' to the material-collecting apparatus 93. Note that the object to be tested 71 may be, but is not limited to, any circuit board that needs to go through required test, but the object to be tested 71 and the tests for it are not intended to limit the disclosure.

As demonstrated above, the transporting machine 2 realizes an integration of an automatic guided vehicle system (AGVS) into testing station. This help achieve an automated testing and therefore reduces labor cost.

Then, the detail of the pick and place apparatus 1 will be provided below with reference to FIG. 1 and further reference to FIGS. 2-5. In this embodiment, the pick and place apparatus 1 may include a housing 10, a lifting assembly 20, and a pick and place assembly 30. The housing 10 means the structure of the pick and place apparatus 1 that is served to be connected to or disposed on the carrier 8 and to support or accommodate the lifting assembly 20 and the pick and place assembly 30. Note that the housing 10 may be fixed onto the carrier 8 using any suitable manner so that the carrier 8 can carry the pick and place apparatus 1 to the predetermined place and position the pick and place apparatus 1 to the predetermined angle.

The lifting assembly 20 is movably disposed on the housing 10. For example, there may be a lifting mechanism 11 disposed on the housing 10, and the lifting assembly 20 may be disposed on the housing 10 by being connected to the lifting mechanism 11. Specifically, the lifting assembly 20 can be moved in a direction D1 or a direction relative to the housing 10 by being driven by the lifting mechanism 11; that is, the height of the lifting assembly 20 in the housing 10 is adjustable by the lifting mechanism 11.

More specifically, the lifting mechanism 11 may include a driving part 110 and one or more chain parts 111 extending along the direction D1 (or, the direction D1'). The driving part 110 may be disposed on the housing 10. The driving part 110 may be any suitable electric motor. The chain parts 111 may be connected to the driving part 110 by any suitable manner. As shown, the chain parts 111 may be connected to an output shaft (not numbered) of the driving part 110 and therefore are movable by the driving part 110. The lifting assembly 20 may include a support frame 21. The support frame 21 may be directly or indirectly connected to the chain parts 111 of the lifting mechanism 11 so that the support frame 21 is movable along the direction D1 or the direction D1' opposite to the direction D1 by being driven by the chain parts 111. For example, the support frame 21 may be connected to the chain parts 111 via a block connected fixed between the support frame 21 and the chain parts 111.

The pick and place assembly 30 is movably disposed on lifting assembly 20. For example, there may be a first transmission mechanism 22 disposed on the lifting assembly 20, the pick and place assembly 30 may be connected to the first transmission mechanism 22 and therefore is movable along a direction D2 or a direction D2' opposite to the direction D2 by being driven by the first transmission mechanism 22. The directions D2 and D2' are substantially perpendicular to the directions D1 and direction D1'; that is, a movable direction of the pick and place assembly 30 relative to the lifting assembly 20 is substantially perpendicular to a movable direction of the lifting assembly 20.

The pick and place assembly 30 may be movably disposed on the lifting assembly 20 via the first transmission mechanism 22. The first transmission mechanism 22 may be arranged at the bottom of the support frame 21; in other words, the first transmission mechanism 22 may be located at a side of the support frame 21 opposite to the pick and place assembly 30. The first transmission mechanism 22 may include a first power source 220, a first transmission belt 221, and a mounting block 222. The first power source 220 may be fixed to the support frame 21 by any suitable manner. The first power source 220 may be any suitable electric motor. The first transmission belt 221 may extend along the direction D2 (or, the direction D2') and may be directly or indirectly connected to the first power source 220. Specifically, the first transmission belt 221 may be connected to an output shaft (not numbered) of the first power source 220 and therefore is movable by being driven by the first power source 220. The mounting block 222 is disposed on the first transmission belt 221, and the mounting block 222 is slidably located at a through hole part 211 formed at the bottom of the support frame 21. The pick and place assembly 30 may include a cage 31, the cage 31 may be located on the support frame 21 and may include a bottom plate 311, the through hole part 211 of the support frame 21 may partially expose the bottom plate 311 of the cage 31, and the mounting block 222 disposed on the first transmission belt 221 may be fixed to the bottom plate 311 through the through hole part 211. Thus, the mounting block 222 is slidably located at the through hole part 211 of the support frame 21 and fixed to the bottom plate 311. As such, the pick and place assembly 30 is movable along the direction D2 or direction D2' by being driven by the mounting block 222 on the first transmission belt 221.

Figure 2:
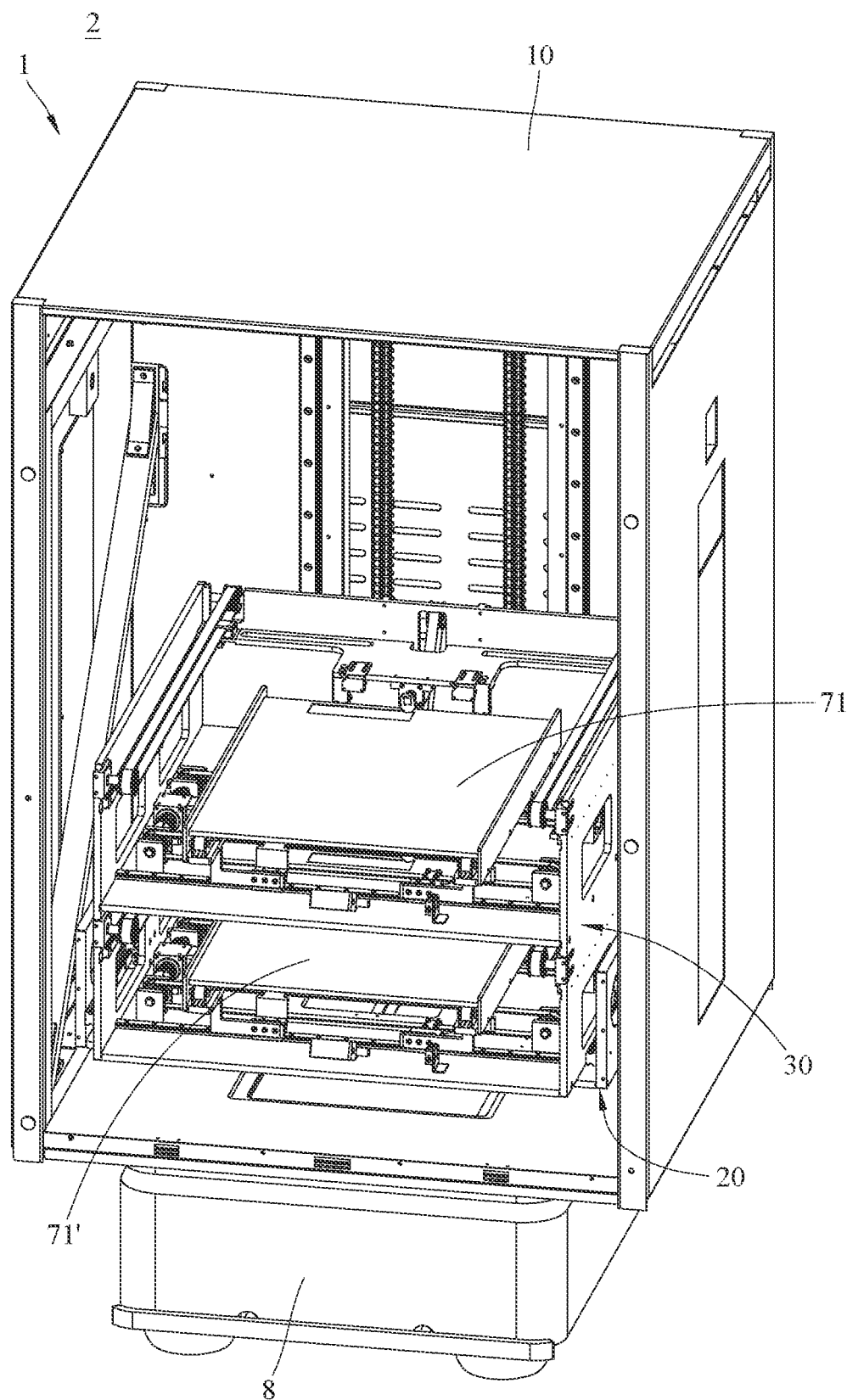
FIG. 2 is a perspective view of a pick and place apparatus according to one embodiment of the disclosure when incorporated with a carrier.
Figure 3:
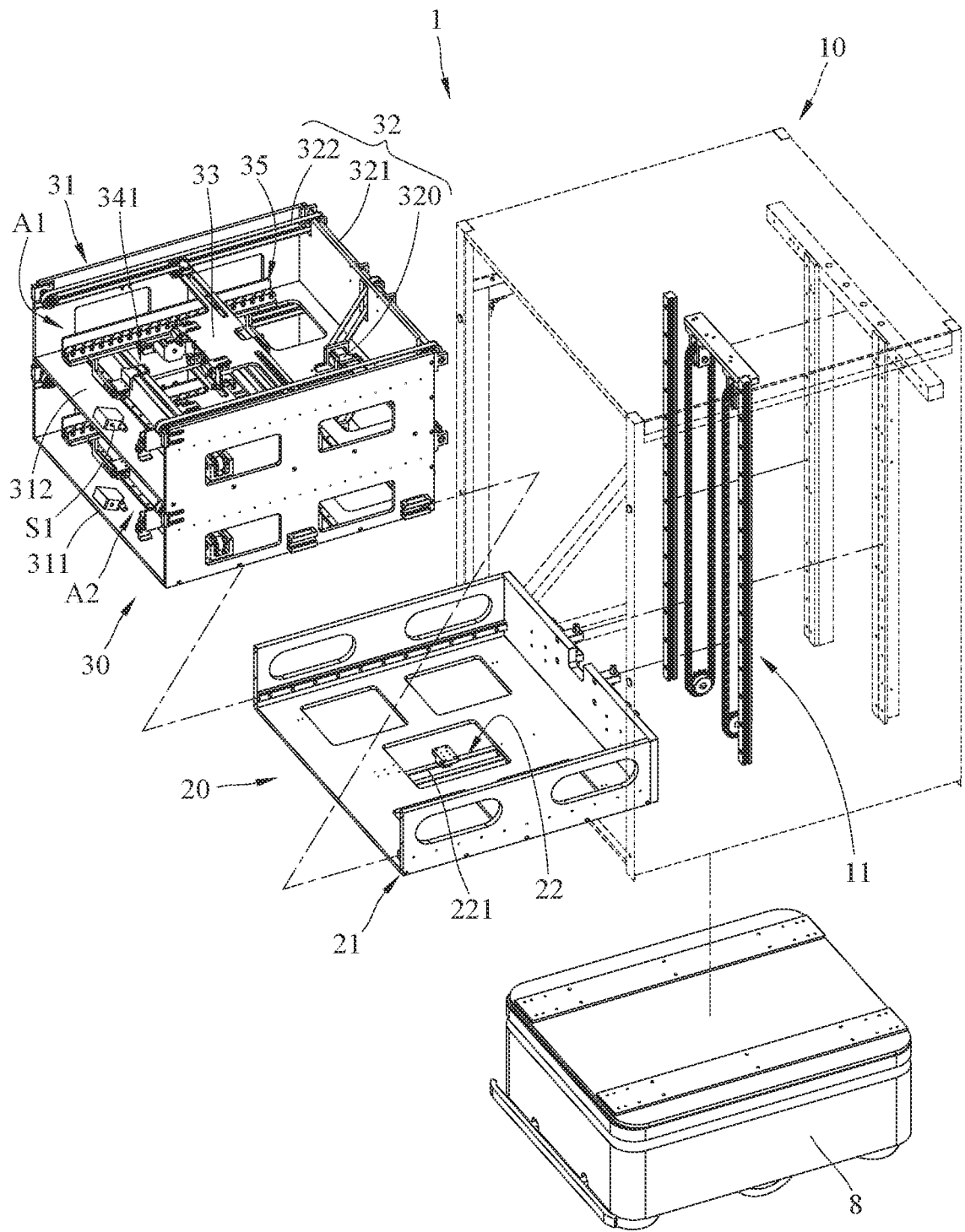
FIG. 3 is an exploded view of a pick and place apparatus according to one embodiment of the disclosure.
Figure 4:
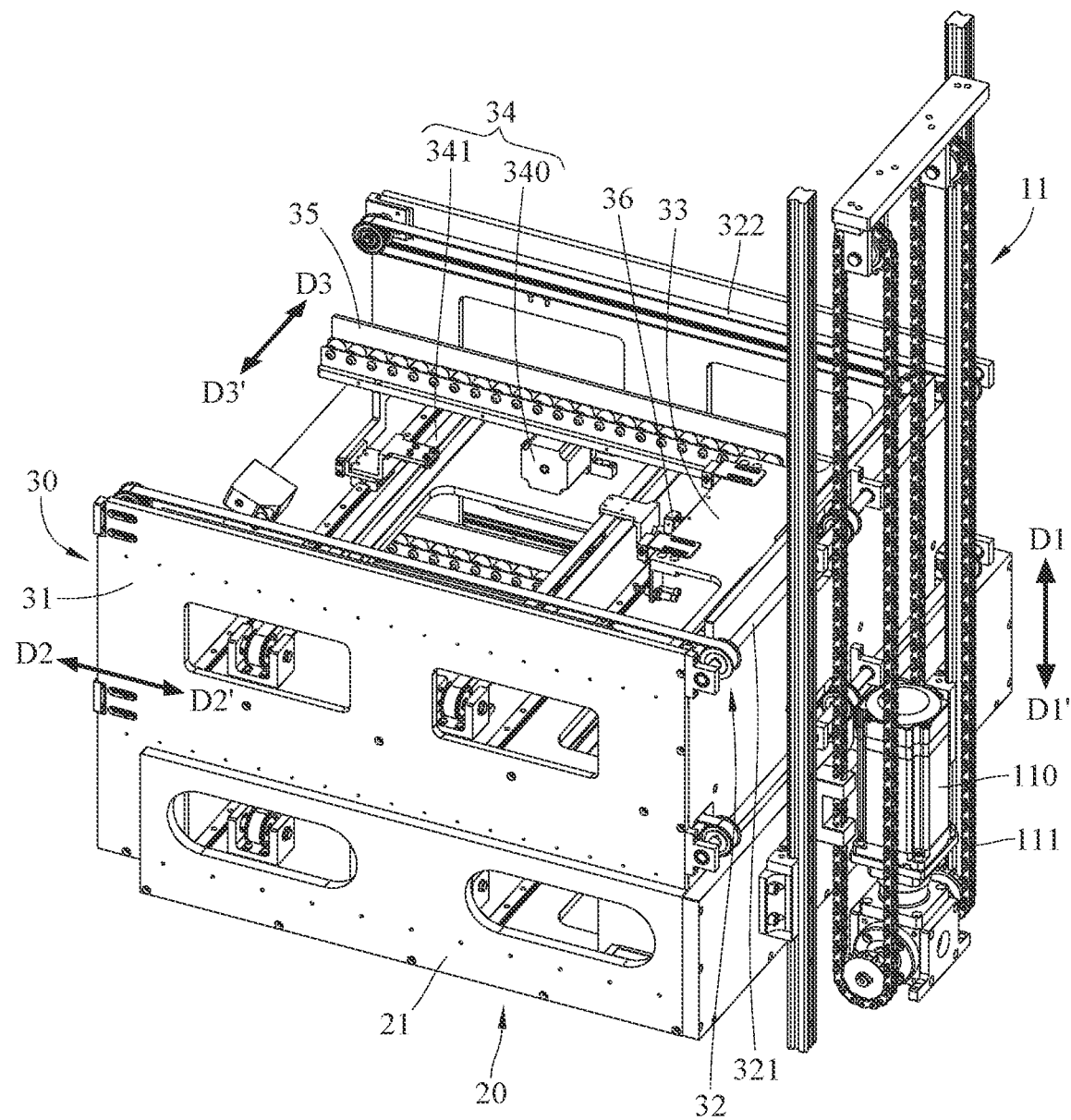
FIGS. 4-6 depicts perspective views of a pick and place apparatus according to one embodiment of the disclosure.
Figure 5:
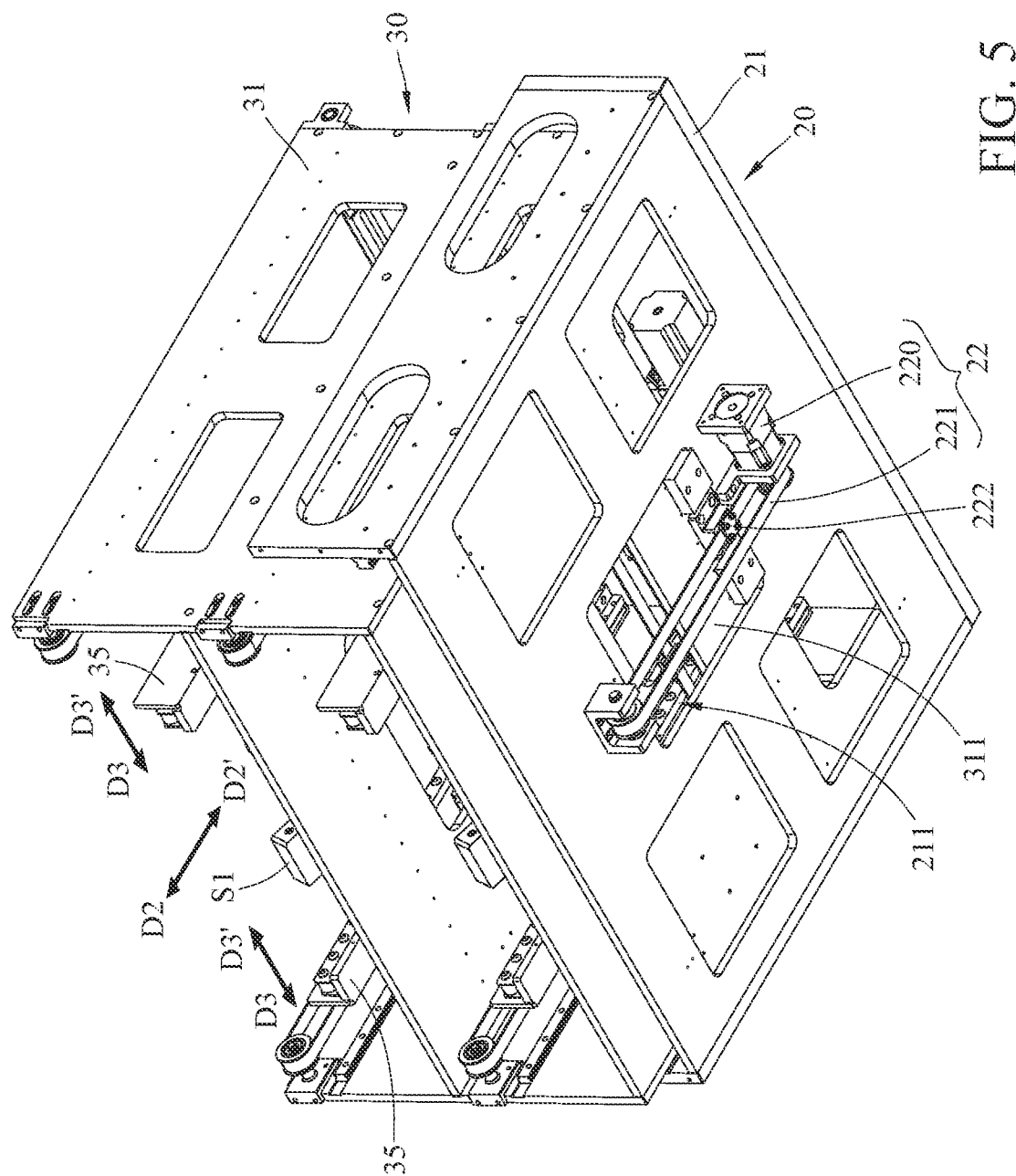

As discussed, how much the pick and place assembly 30 sticks out of the housing 10 is adjustable by the first transmission mechanism 22. Specifically, by being driven by the first transmission mechanism 22, the pick and place assembly 30 may be drawn back into the housing 10 or moved to stick out of the housing 10. Meanwhile, as the lifting assembly 20 is driven by the lifting mechanism 11, the height of the pick and place assembly 30 relative to the housing 10 can be adjusted as well. Referring to FIGS. 2 and 4, the pick and place assembly 30 is allowed to selectively move upward, downward, forward, or backward relative to the housing 10, which facilitates the implementation of the aforementioned steps, such as picking and placing object to be tested 71 and tested object 71'.

Figure 6:
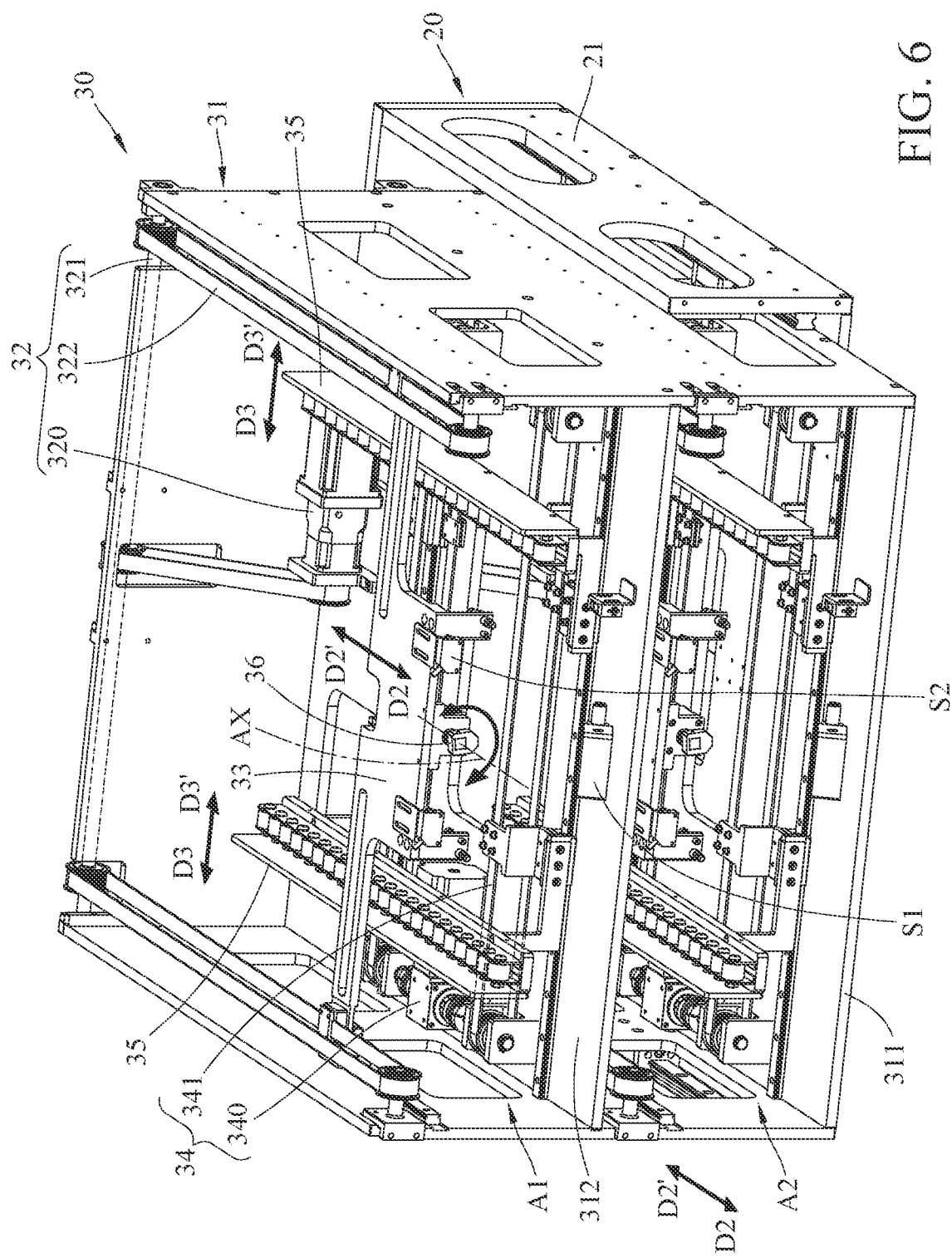

Then, the detail of the pick and place assembly 30 will be given below with reference to FIGS. 2-5 and further reference to FIG. 6. As shown, in this embodiment, there may be a partition plate 312 arranged in the cage 31 of the pick and place assembly 30, the partition plate 312 divides the internal space of the cage 31 into a first area A1 and a second area A2. The first area A1 may be defined by the partition plate 312 and sidewalls (not numbered) of the cage 31, and the second area A2 may be defined by the partition plate 312 and the sidewalls (not numbered) and the bottom plate 311 of the cage 31. Note that the first area A1 and the second area A2 may have the same arrangements therein, thus the following may focus on describing the arrangement in the first area A1.

The pick and place assembly 30 may have a second transmission mechanism 32, a movable support 33, a third transmission mechanism 34, two clamping rails 35, and a retaining component 36 in the first area A1. The second transmission mechanism 32 is disposed on the cage 31 and may include a second power source 320, a transmission shaft 321, and a plurality of second transmission belts 322. The second power source 320 may be any suitable electric motor and may be disposed on the partition plate 312. The second transmission belts 322 may extend along the direction D2 (or, the direction D2') and may be connected to different parts of the transmission shaft 321. The transmission shaft 321 may be connected to an output shaft (not numbered) of the second power source 320 by any suitable manner (e.g., a transmission belt connected between the output shaft of the second power source 320 and the transmission shaft 321). As such, the second transmission belts 322 may be rotatable by being driven by the transmission shaft 321 and the second power source 320.

The movable support 33 is disposed on the cage 31 via the second transmission mechanism 32. In detail, the movable support 33 may be connected to the second transmission belts 322 and therefore is movable along the direction D2 or direction D2' by being driven by the second transmission belts 322. Thus, a movable direction of the movable support 33 relative to the cage 31 of the pick and place assembly 30 is substantially parallel to the movable direction of the cage 31 of the pick and place assembly 30 relative to the lifting assembly 20. The retaining component 36 is pivotably disposed on the movable support 33. Specifically, the retaining component 36 is pivotably disposed on the front edge of the movable support 33. Further, the retaining component 36 is pivotable about an axis AX, and the axis AX is off-centered; in other words, the retaining component 36 may be served as an eccentric cam whose center of rotation positioned "off center". Note that the retaining component 36 may be driven by any suitable means and that is not intended to limit the disclosure.

The third transmission mechanism 34 may include a third power source 340 and at least one third transmission belt 341. The third power source 340 may be any suitable electric motor and may be disposed on the cage 31 of the pick and place assembly 30. Specifically, the third power source 340 may be disposed on the partition plate 312 of the cage 31. The third transmission belt 341 may be connected to the third power source 340. Specifically, the third transmission belt 341 may extend along a direction D3 (or a direction D3' opposite to the direction D3), and the third transmission belt 341 may be connected to an output shaft (not numbered) of the third power source 340 by any suitable manner, such that the third transmission belt 341 is rotatable by being driven by the third power source 340. As shown, the directions D3 and D3' are substantially perpendicular to the directions D1 and D1' and the directions D2 and D2'.

The clamping rails 35 are movably disposed on the cage 31 of the pick and place assembly 30 via the third transmission mechanism 34 so that the distance therebetween is adjustable. Specifically, the clamping rails 35 may be arranged parallel to each other and may be connected to or disposed on the third transmission belt 341, and the clamping rails may be substantially perpendicular to the third transmission belt 341. For example, an extension direction of each clamping rail 35 may be substantially parallel to the direction D2 (or, the direction D2'); in other words, the clamping rails 35 may extend in a direction substantially parallel to the movable direction of the pick and place assembly 30 relative to the lifting assembly 20. The clamping rails 35 may be respectively arranged at different parts of the third transmission belt 341. Specifically, one of the clamping rails 35 may be connected to a part of the third transmission belt 341 located relative close the partition plate 312 of the cage 31 (or, the bottom plate 311), and the other clamping rail 35 may be connected to a part of the third transmission belt 341 located relative away from the partition plate 312 of the cage 31 (or, the bottom plate 311). More specifically, the third transmission belt 341 may form a circle-like shape having a lower part located closer to the partition plate 312 (or, the bottom plate 311) and an upper part located away from the partition plate 312 (or, the bottom plate 311), one of the clamping rails 35 is connected to the lower part of the third transmission belt 341 and the other clamping rail 35 is connected to the upper part of the third transmission belt 341.

In such an arrangement, the clamping rails 35 are respectively connected to parts of the third transmission belt 341 movable in opposite directions. Thus, the clamping rails are movable in the direction D3 or direction D3' and able to be moved toward each other or away from each other to adjust the distance therebetween. As shown, the movable direction of the third transmission belt 341 (or the clamping rails 35) is substantially perpendicular to the movable direction of the movable support 33, the movable direction of the cage 31 relative to the lifting assembly 20, and the movable direction of the lifting assembly 20.

In one application, the distance between the clamping rails 35 may be adjusted to fit the size of an plate-shaped object (e.g., the object to be tested 71 or tested object 71') supported by the clamping rails 35, by doing so, the clamping rails 35 is able to support and clamp the object (e.g., the object to be tested 71 or tested object 71') so as to guide it to move along the direction D2 or direction D2'. Note that the distance between the clamping rails can be further adjusted to release, slightly touch, or tightly hold the plate-shaped object.

The retaining component 36 being pivotably disposed on the front edge of the movable support 33 has an axis AX being off-centered, thus part of the retaining component 36 is able to contact or press against the plate-shaped object as it pivots to a specific angle relative to the movable support 33. For example, the movable support 33 is selectively moved outward from the cage 31 along the direction D2 and the retaining component 36 can pivot to catch a plate-shaped object (e.g., the object to be tested 71) located outside the cage 31, by doing so, the retaining component 36 can retain the plate-shaped object to be sent into the cage 31, and then the movable support 33 can be moved in the direction D2' to use the retaining component 36 to move the plate-shaped object into the selected area (e.g., first area A1) of the cage 31. While the plate-shaped object is moving in the cage 31, it can be supported and guided by the clamping rail 35 along the direction D2' to reach a predetermined position.

Optionally, the first area A1 and the second area A2 of the cage 31 may each have an optical sensor S1 therein; in other words, there may be two optical sensors S1 respectively arranged in the first area A1 and the second area A2 of the cage 31. Specifically, the optical sensors S1 may be arranged at the entrance part of the cage 31; in other words, the optical sensors S1 may be arranged at the opening of the cage 31. As such, the optical sensors S1 are able to be employed to determine whether a plate-shaped object (e.g., the object to be tested 71 or tested object 71') exists in the first area A1 and the second area A2 for the pick and place apparatus 1 to decide what action it should take.

Optionally, the first area A1 and the second area A2 of the cage 31 may each have a pressure sensor S2; in other words, there may be two pressure sensors S1 respectively arranged in the first area A1 and the second area A2 of the cage 31. The pressure sensors S2 are served to measure or detect pressure. Specifically, the pressure sensors S2 may be disposed at a side of the movable support 33 facing towards the entrance part (or, the opening) of the cage 31. When the movable support 33 uses the retaining component 36 to push a plate-shaped object (e.g., the object to be tested 71 or tested object 71') out of the cage 31, the plate-shaped object may be stopped by external structure (e.g., a receiver of the testing apparatus 92), and then the pressure sensor S2 can measure pressure from the plate-shaped object so that the pick and place apparatus 1 will be able to determine whether the plate-shaped object reaches the predetermined position.

The operation that the transporting machine 2 picks up an object to be tested 71 from the material-supplying apparatus 91 at least involves the following steps:

1. The carrier 8 carries the pick and place apparatus 1 to a place that an object to be tested 71 on the material-supplying apparatus 91 is accessible by the pick and place apparatus 1;
2. The second transmission mechanism 32 in the first area A1 or second area A2 that corresponds to the object to be tested 71 is activated, the second power source 320 drives the movable support 33 to move along the direction D2 via the transmission shaft 321 and the second transmission belt 322 so that the movable support 33 is moved outward from the cage 31;

3. The retaining component 36 pivots and presses against the object to be tested 71 as the movable support 33 moves to a position close to the object to be tested 71;

4. The second transmission mechanism 32 is activated to move the movable support 33 backward (along the direction D2'), such that the movable support 33, the retaining component 36, and the object to be tested 71 caught by the retaining component 36 are all moved back into the cage 31 along the direction D2';

5. Optionally, the third transmission mechanism 34 may be activated to move the clamping rails 35 toward each other or away from each other (along the direction D3 and direction D3') so as to make the distance between the clamping rails 35 fit width of the object to be tested 71, by doing so, the object to be tested 71 is supported and clamped by the clamping rails 35; and 6. When the object to be tested 71 reaches the predetermined area of the cage 31 (e.g., when the pressure sensor S2 is pressed by the object to be tested 71), the second transmission mechanism 32 is turned off. During the placement of the object to be tested 71 into the cage 31, the optical sensor S1 is able to determine whether the object to be tested 71 actually exists in the selected area of the cage 31.

The operation that the transporting machine 2 provides the object to be tested 71 to the testing apparatus 92 at least involves the following steps:

1. The carrier 8 carries the pick and place apparatus 1 to in front of the selected testing apparatus 92;

2. Optionally, the lifting mechanism 11 of the pick and place apparatus 1 may be activated to move the lifting assembly 20 upward (i.e., in direction D1) or downward (i.e., in direction D1') so as to make the object to be tested 71 picked up by the pick and place assembly 30 move to a height matching the selected receiver (not numbered) of the testing apparatus 92; and 3. The second transmission mechanism 32 is activated to move the movable support 33, the retaining component 36, and the object to be tested 71 caught by the retaining component 36 move outward from the cage 31 along the direction D2, thus, the object to be tested 71 will be inserted into the selected receiver of the testing apparatus 92. During the placement of the object to be tested 71 into the testing apparatus 92 by the movable support 33, the pick and place apparatus 1 is able to determine whether the object to be tested 71 is actually placed into the required area of the testing apparatus 92 by the pressure value detected by the pressure sensor S2.

When the optical sensor S1 in the second area A2 of the cage 31 detects no plate-shaped object as the pick and place apparatus 1 at the testing apparatus 92, the retaining component 36 in the second area A2 can perform the action similar to that in catching an object to be tested 71 from the material-supplying apparatus 91 to take a tested object 71' from the testing apparatus 92.

The operation that the transporting machine 2 provides a tested object 71' to the material-collecting apparatus 93 at least involves the following steps:

1. The carrier 8 carries the pick and place apparatus 1 to a place for the pick and place assembly 30 to be able to place a tested object 71' on to material-collecting apparatus 93;

Optionally, the lifting mechanism 11 of the pick and place apparatus 1 may be activated to move the lifting assembly 20 upward (i.e., in direction D1) or downward (i.e., in direction D1') so as to make the tested object 71' collected by the pick and place assembly move to a height correspond to or close to a transmission mechanism or a conveyor belt (not numbered) of the material-collecting apparatus 93; and 3. The second transmission mechanism 32 is activated to move the movable support 33, the retaining component 36, and the tested object 71' caught by the retaining component 36 move outward from the cage 31 along the direction D2, and then the tested object 71' will be provided to the material-collecting apparatus 93.

Through the aforementioned actions, the pick and place apparatus 1 is able to pick up an object to be tested 71, provide the object to be tested 71 to the testing apparatus 92, pick up a tested object 71' from the testing apparatus 92, and provide the tested object 71' to the material-collecting apparatus 93.

In summary, there is a lifting assembly 20 being movable upward or downward on the housing 10 of the pick and place apparatus 1, and there is a pick and place assembly 30 being movable forward or backward on the lifting assembly 20, thus the movable direction of the lifting assembly 20 is perpendicular to that of the pick and place assembly 30 relative to the lifting assembly 20. As such, the object to be tested 71 and/or tested object 71' on the pick and place assembly 30 is easily moved to the required height and position. Meanwhile, there are one or more pairs of clamping rails 35 on the pick and place assembly 30 that are adjustable to fit the width of the object to be tested 71 and/or tested object 71', thus the pick and place apparatus 1 can be widely used in testing for various configurations of plate-shaped product.

Note that the quantities of the transporting machines and the testing apparatus adopted in the automatic testing system may be modified as required and not intended to limit the disclosure. It is also noted that the quantity of the layers in the cage of the pick and place assembly may be increased or reduced as required. In addition, any suitable means that can achieve upward and downward motion may be served as the lifting assembly of the disclosure; for example, in another embodiment, the pick and place apparatus may employ a jack as the lifting mechanism. In another embodiment, the pick and place assembly may be installed on a XYZ axis displacement platform to realize multiple directional movements of the pick and place assembly.

According to the pick and place apparatus and the transporting machine as discussed in the above embodiments of the disclosure, the housing of the pick and place apparatus can be disposed on a carrier, so that it is possible to adopt an automatic guided vehicle system into testing station and thereby achieving an automated testing processes and reducing labor cost.

Also, the pick and place apparatus has a lifting assembly and a pick and place assembly being movable perpendicularly with each other on the housing, such that the pick and place apparatus can move the pick and place assembly to a proper height and position for it to pick and place object to be tested or tested object.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A pick and place apparatus, adapted for a carrier, comprising:
   a housing, connected to the carrier;
   a lifting assembly, movably disposed on the housing; and
   a pick and place assembly, movably disposed on the lifting assembly,
   wherein a movable direction of the pick and place assembly relative to the lifting assembly is perpendicular to a movable direction of the lifting assembly;
   wherein the lifting assembly comprises a support frame and a first transmission mechanism, the pick and place assembly comprises a cage, the cage is located on the support frame and comprises a bottom plate, the support frame has a through hole part exposing a part of the bottom plate of the cage, the first transmission mechanism comprises a mounting block, the mounting block is slidably located at the through hole part and fixed to the bottom plate of the cage.

2. The pick and place apparatus according to claim 1, further comprising a lifting mechanism, wherein the lifting mechanism comprises a driving part and a chain part, the driving part is disposed on the housing, the chain part is connected to the driving part, and the lifting assembly comprises a support frame connected to the chain part.

3. The pick and place apparatus according to claim 1, wherein the first transmission mechanism further comprises a first power source, and a first transmission belt, the first power source is disposed on the support frame, the first transmission belt is connected to the first power source, the mounting block is disposed on the first transmission belt, and the pick and place assembly is movably disposed on the lifting assembly via the first transmission mechanism.

4. The pick and place apparatus according to claim 3, wherein the pick and place assembly further comprises a second transmission mechanism and a movable support, the second transmission mechanism is disposed on the cage, the movable support is disposed on the cage via the second transmission mechanism, and a movable direction of the movable support relative to the cage is parallel to a movable direction of the cage relative to the lifting assembly.

5. The pick and place apparatus according to claim 3, wherein the pick and place assembly further comprises a partition plate disposed in the cage to divide an internal space of the cage into a first area and a second area, the first area and the second area each has a second transmission mechanism and a movable support therein, the second transmission mechanism is disposed on the cage, the movable support is disposed on the cage via the second transmission mechanism, and a movable direction of the movable support relative to the cage is parallel to a movable direction of the cage relative to the lifting assembly.

6. The pick and place apparatus according to claim 5, wherein the first area and the second area each has a retaining component therein, the retaining component is pivotably disposed on the movable support, and an axis of the retaining component is off-centered.

7. The pick and place apparatus according to claim 5, wherein the first area and the second area each has two clamping rails and a third transmission mechanism therein, the clamping rails are movably disposed on the cage of the pick and place assembly via the third transmission mechanism, and a distance therebetween is adjustable.

8. The pick and place apparatus according to claim 7, wherein a movable direction of the clamping rails relative to the cage is perpendicular to the movable direction of the cage relative to the lifting assembly, and the movable direction of the lifting assembly.

9. The pick and place apparatus according to claim 8, wherein an extension direction of each of the clamping rails is parallel to the movable direction of the pick and place assembly relative to the lifting assembly.

10. The pick and place apparatus according to claim 9, wherein the third transmission mechanism comprises a third power source and a third transmission belt, the third power source is disposed on the cage of the pick and place assembly, the third transmission belt is connected to the third power source, the clamping rails are movably disposed on the cage via the third transmission belt, one of the clamping rails is connected to one part of the third transmission belt located relatively close to the bottom plate of the cage, and the other one of the clamping rail is connected to the other part of the third transmission belt located relatively away from the bottom plate of the cage.

11. The pick and place apparatus according to claim 5, wherein the first area and the second area each has a pressure sensor therein, and the pressure sensor is disposed at a side of the movable support facing towards an entrance part of the cage.

12. A transporting machine, comprising:
    a carrier; and
    a pick and place apparatus, comprising:
    a housing, connected to the carrier;
    a lifting assembly, movably disposed on the housing; and
    a pick and place assembly, movably disposed on the lifting assembly, wherein a movable direction of the pick and place assembly relative to the lifting assembly is perpendicular to a movable direction of the lifting assembly;
    wherein the lifting assembly comprises a support frame and a first transmission mechanism, the pick and place assembly comprises a cage, the cage is located on the support frame and comprises a bottom plate, the support frame has a through hole part exposing a part of the bottom plate of the cage, the first transmission mechanism comprises a mounting block, the mounting block is slidably located at the through hole part and fixed to the bottom plate of the cage.

13. The transporting machine according to claim 12, wherein the first transmission mechanism further comprises a first power source, and a first transmission belt, the first power source is disposed on the support frame, the first transmission belt is connected to the first power source, the mounting block is disposed on the first transmission belt, and the pick and place assembly is movably disposed on the lifting assembly via the first transmission mechanism.

14. The transporting machine according to claim 13, wherein the pick and place assembly further comprises a partition plate disposed in the cage to divide an internal space of the cage into a first area and a second area, the first area and the second area each has a second transmission mechanism and a movable support therein, the second transmission mechanism is disposed on the cage, the movable support is disposed on the cage via the second transmission mechanism, and a movable direction of the movable support relative to the cage is parallel to a movable direction of the cage relative to the lifting assembly.

15. The transporting machine according to claim 14, wherein the first area and the second area each has a retaining component therein, the retaining component is pivotably disposed on the movable support, and an axis of the retaining component is off-centered.

16. The transporting machine according to claim 14, wherein the first area and the second area each has two clamping rails and a third transmission mechanism therein, the clamping rails are movably disposed on the cage of the pick and place assembly via the third transmission mechanism and a distance therebetween is adjustable, and an extension direction of the clamping rails is parallel to the movable direction of the cage relative to the lifting assembly.

17. The transporting machine according to claim 16, wherein a movable direction of the clamping rails relative to the cage is perpendicular to the movable direction of the cage relative to the lifting assembly and the movable direction of the lifting assembly.

18. The transporting machine according to claim 16, wherein the third transmission mechanism comprises a third power source and a third transmission belt, the third power source is disposed on the cage of the pick and place assembly, the third transmission belt is connected to the third power source, the clamping rails are movably disposed on the cage via the third transmission belt, one of the clamping rails is connected to one part of the third transmission belt located relatively close to the bottom plate of the cage, and the other one of the clamping rail is connected to the other part of the third transmission belt located relatively away from the bottom plate of the cage.

19. The transporting machine according to claim 14, wherein the first area and the second area each has a pressure sensor therein, and the pressure sensor is disposed at a side of the movable support facing towards an entrance part of the cage.

20. The transporting machine according to claim 14, wherein the first area and the second area each has an optical sensor therein, and the optical sensor is disposed at an entrance part of the cage.

* * * * *